United States Patent [19]

Bur et al.

[11] Patent Number: 4,577,510
[45] Date of Patent: Mar. 25, 1986

[54] DYNAMIC POLYMER PRESSURE TRANSDUCER WITH TEMPERATURE COMPENSATION

[75] Inventors: Anthony J. Bur, Rockville; Steven C. Roth, Frederick, both of Md.

[73] Assignee: The United States of America as represented by the Secretary of the Air Force, Washington, D.C.

[21] Appl. No.: 647,782

[22] Filed: Sep. 6, 1984

[51] Int. Cl.$^4$ .......................... G01L 9/08; G01K 7/10
[52] U.S. Cl. ........................................ 73/708; 73/754; 73/DIG. 4; 374/143; 374/179
[58] Field of Search ................ 73/708, 714, 754, 766, 73/DIG. 4; 374/143, 179

[56] References Cited

U.S. PATENT DOCUMENTS

| | | | |
|---|---|---|---|
| 3,060,748 | 10/1962 | Schwartz | 73/708 |
| 3,894,424 | 7/1975 | Edelman et al. | 307/88 ET |
| 3,940,974 | 3/1976 | Taylor | 73/DIG. 4 |
| 3,970,862 | 7/1976 | Edelman et al. | 307/88 ET |
| 3,971,250 | 7/1976 | Taylor | 73/DIG. 4 |
| 4,366,714 | 1/1983 | Adorni | 73/708 |

FOREIGN PATENT DOCUMENTS 0501314  1/1976  U.S.S.R. ............................... 73/708

*Primary Examiner*—Donald O. Woodiel
*Attorney, Agent, or Firm*—Donald J. Singer; William G. Auton

[57] ABSTRACT

Accurate dynamic pressure data in a changing thermal environment is obtained through the use of a pressure gage formed from polyvinylidene fluoride (PVDF) polymer material. The temperature compensation pressure gage has three major elements: an active PVDF transducer which obtains remote pressure readings which are uncorrected for thermal effects; a thermocouple having a short rise time allowing an output thermal signal which dynamically responds to changing thermal conditions; and a compensation amplifier circuit receiving the uncorrected pressure readings and the dynamic thermal signal and producing an output signal representing accurate pressure data which is corrected for changing thermal conditions. Also disclosed are the details of making an active PVDF transducer.

9 Claims, 2 Drawing Figures

DYNAMIC POLYMER PRESSURE TRANSDUCER WITH TEMPERATURE COMPENSATION

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the broad area of pressure probes and, more specifically, to a polymer pressure transducer used to obtain accurate dynamic pressure data in the presence of a changing thermal environment.

The task of obtaining remote pressure determinations without the influence of changing thermal conditions has been alleviated to some degree by prior art techniques. The extent of these prior art techniques is given by the following patents:

U.S. Pat. No. 3,060,748 issued to Schwartz on Oct 30, 1962;
U.S. Pat. No. 3,894,243 issued to Edelman et al on July 2, 1975;
U.S. Pat. No. 3,940,974 issued to Taylor on March 2, 1976;
U.S. Pat. No. 3,970,862 issued to Edelman et al on July 20, 1976; and
U.S. Pat. No. 4,366,714 issued to Adorni on January 4, 1983.

The Taylor device is a temperature sensor which, like the present invention, is formed from polyvinylidene fluoride (PVDF) having both pyroelectric and piezoelectric properties. The two Edelman et al patents show PVDF polymer film transducer sandwich constructions. Adorni discloses a pressure/temperature probe with separate pressure and temperature transducers connected in series to permit temperature correction. Finally, Schwartz shows an accelerometer with temperature correction features. In view of the foregoing discussion, it is apparent that there currently exists the need for a polymer pressure transducer with thermocouple construction that obtains accurate dynamic pressure data in the presence of a changing thermal environment. The present invention is directed towards satisfying that need.

SUMMARY OF THE INVENTION

This invention provides a means of obtaining accurate dynamic pressure data in a changing thermal environment through the use of a pressure gage formed from polvinylidene fluoride (PVDF) polymer material. The temperature compensation pressure gage has three major elements:

an active PVDF transducer which obtains remote pressure readings which are uncorrected for thermal effects;
a thermocouple having a short rise time allowing an output thermal signal which dynamically responds to changing thermal conditions; and,
a compensation amplifier circuit receiving the uncorrected pressure readings and the dynamic thermal signal and producing an output signal representing accurate pressure data which is corrected for changing thermal conditions.

It is a principal object of the invention to provide a new and improved means of obtaining accurate pressure data.

It is another object of the invention to provide a means for automatically compensating for changing thermal conditions.

These, together with other objects features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

This invention provides a means of obtaining accurate dynamic pressure data in a changing thermal environment through the use of a pressure gage formed from polyvinylidene fluoride (PVDF) polymer material. The temperature compensation pressure gage has three major elements:

an active PVDF transducer which obtains remote pressure readings which are uncorrected for thermal effects;
a thermocouple having a short rise time allowing an output thermal signal which dynamically responds to changing thermal conditions; and
a compensation amplifier circuit receiving the uncorrected pressure readings and the dynamic thermal signal and producing an output signal representing accurate pressure data which is corrected for changing thermal conditions.

Figure 1:
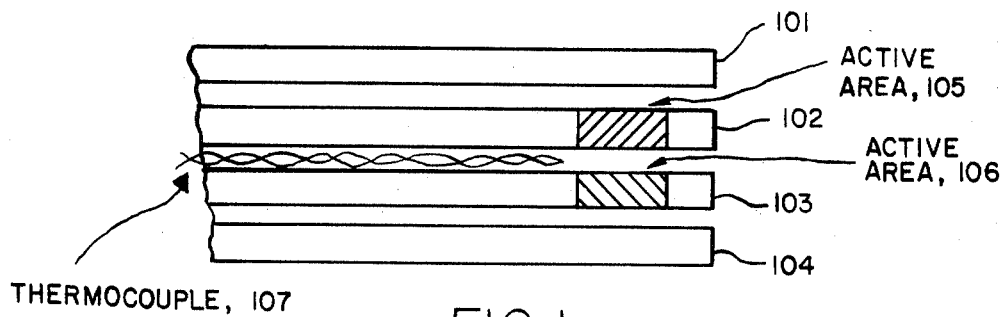
FIG. 1 is an illustration of the PVDF transducer with the thermocouple.

The PVDF transducer with thermocouple is shown in FIG. 1. It is made from four 12 $\mu$m sheets of PVDF 101–104 which have been laminated together using epoxy. The inner two sheets 102 and 103 contain active areas 105 and 106 on which aluminum electrodes have been deposited. The active area can vary in size from 1 mm to several centimeters in diameter. The outer two layers 101 and 104 serve as protection for the inner two so that the gage can be used in environments requiring mechanical ruggedness. A copper-constantan thermocouple junction 107, made with 75 $\mu$m (3 mil) wire, is placed between the inner two sheets and within 2 mm of the active transducer area. When laminated together, the thickness of the tranducer is approximatly 100 $\mu$m (0.1 mm).

The four sheets 101–104 of the pressure gage illustrated in FIG. 1 are composed of polyvinylidene fluoride (PVDF). It is available as thin sheets or films which are normally inactive and becomes piezoelectrically and pyroelectrically active by poling a region of the material with a large electric field, resulting in its transducer behavior. Therefore, prior to lamination the electroded regions 105 and 106 are made piezoelectrically active by poling them at room temperature with an electric field of 2 megavolts/cm (Mv/cm). The active areas are then laminated face-to-face so that the polarization vectors in each element point in opposite directions. In this bilaminate pattern, the ground electrodes are on the exterior surface and the inner electrodes form the high potential.

One of the advantages of this design is that signals generated in the two elements by bending are opposite in polarity and add to zero.

In laboratory shock tube experiments, it has been shown that PVDF can be used as a detector up to pressures $2.5 \times 10^9$ newtons/m² (Pa) ($3.6 \times 10^5$ psi) There appears to be no inherent materials shortcoming which would inhibit the use of PVDF at high pressures.

Since the poled material will respond to both temperature and pressure changes, an uncompensated transducer can be used to measure pressure only under isothermal conditions. In many situations pressure waves are accompanied by adiabatic thermal pulses or thermal energy from another source. In order to measure pressure accurately, it is necessary to correct the electrical signal from the transducer in accordance with the thermal energy which it has absorbed. The measurement system, which is described here, has been developed for the purpose of obtaining accurate dynamic pressure data in the presence of a changing thermal environment. The method of temperature compensation is: (a) to measure the temperature change of the PVDF transducer using a thermocouple; (b) to amplify the thermocouple voltage to equal that generated by the pyroelectric response of the gage; and (c) to add transducer voltage to the amplified thermocouple voltage yielding a corrected gage voltage. This corrected output is solely proportional to the pressure which is applied to the active area of the transducer.

Figure 2:
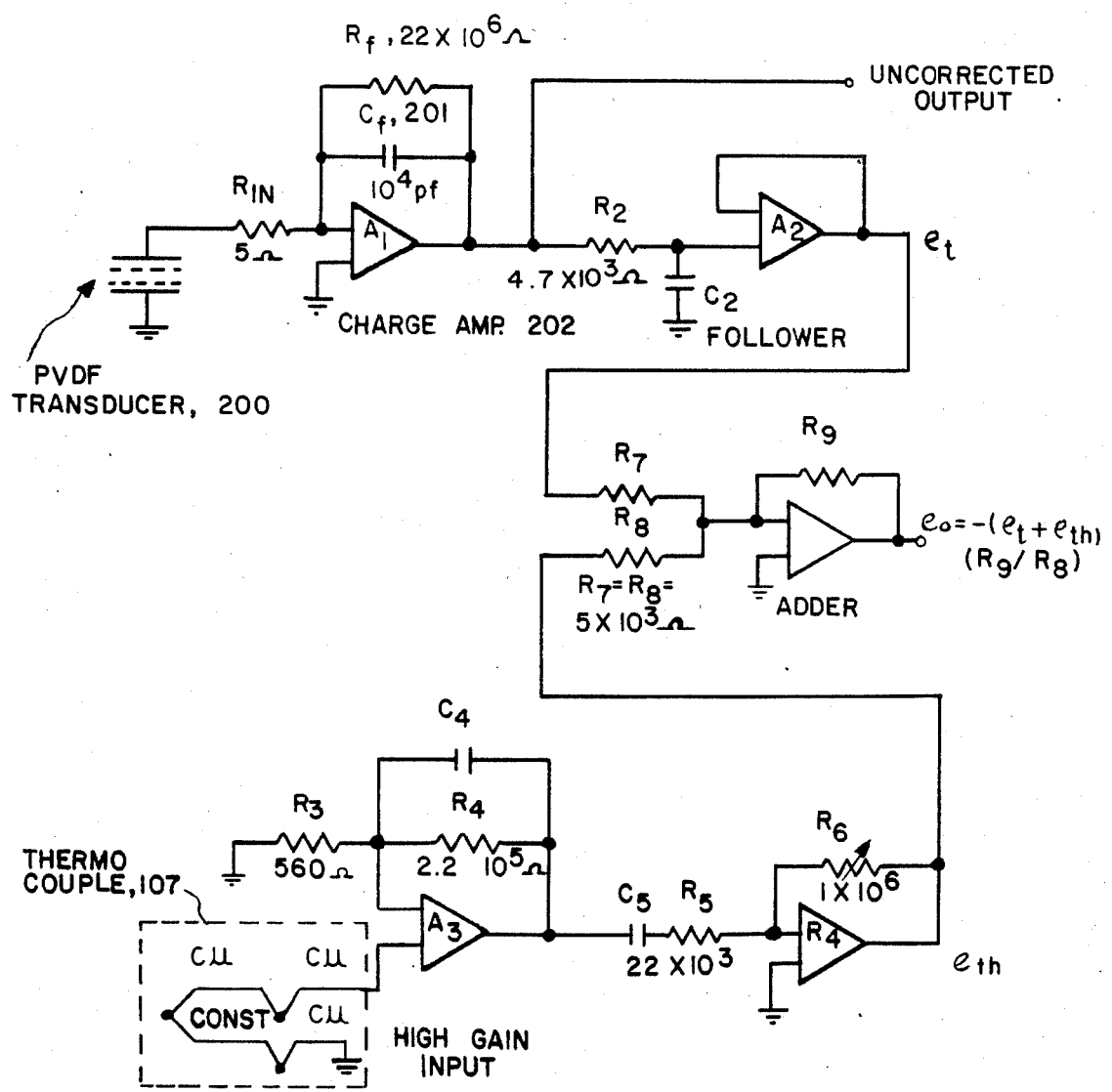
FIG. 2 is a block diagram of the temperature compensation circuit as connected to the PVDF transducer and the thermocouple.

FIG. 2 is an illustration of the temperature compensation method to which the transducer and thermocouple is connected. Temperature compensation is accomplished through the use of five amplifier circuits consisting of: amplifiers $A_1$, $A_2$ and $A_3$, operational amplifiers $A_4$ and $A_5$, ten resistors $R_2$-$R_9$, $R_{in}$ and $R_f$, and four capacitors $C_f$, $C_2$, $C_4$ and $C_5$.

In FIG. 2 the PVDF transducer 200 is grounded on the side of negative polarization so that the output voltage of the charge amplifier is negative when a positive pressure is applied, i.e. $e_t = -Q/C_f$ where Q is the charge generated by a positive pressure change P. Since the PVDF transducer 200 is a charge generating device, its signal is converted to a voltage via a feedback capacitor $C_f$, 201 in a charge amplifier. When the transducer 200 responds to both temperature and pressure simultaneously, the transducer charge, $q_t = q_p - q_{th}$, where $q_p$ is the charge proportional to pressure and $q_{th}$ is the charge proportional to temperature. These charges combine out of phase because a positive pressure and a positive temperature will generate charges of opposite sign. The feedback capacitor 201 converts these charges to corresponding voltages, $e_t = q_p/C_f - q_{th}/C_f = e_p - e_{th}$ where $e_{th}$ is the voltage proportional to the temperature change $\Delta T$, $e_p$ is a voltage proportional to the pressure change $\Delta P$, and $e_t$ is the output (transducer) voltage from the charge amplifier. In terms of pyroelectric and hydrostatic piezoelectric coefficients $\lambda$ and $d_h$ $$q_p = d_h A_e \Delta P \tag{1}$$

$$q_{th} = \lambda A_e \Delta T, \tag{2}$$

where $A_e$ is the area of the electrodes. Equations (1) and (2) define the coefficients $\lambda$ and $d_h$.

The time constants, $R_f C_f$ and $R_2 C_2$, determine the high and low frequency 3 db points and are set at 220 ms and 32 μs respectively; this corresponds to a frequency range from 1 Hz to $10^4$ Hz. The amplifier $A_2$ is a voltage follower with a gain of 1 which serves as a buffer.

Amplifiers $A_3$ and $A_4$ determine the amplification factor $A_f$ for the thermocouple signal. The exact value of $A_f$ which is needed for a particular transducer can be obtained by adjusting the gain of $A_4$. The value of the input amplification, $A_3$, is set at 400. High and low frequency 3 db points are established using time constants $R_4 C_4$ and $R_5 C_5$ where $R_4 C_4 = R_2 C_2$ and $R_5 C_5 = R_f C_f$ so that the phase shifts for the transducer and thermocouple amplifiers are the same.

The thermocouple junction, which is positioned close to the active area of the transducer, provides a voltage, $V_{th} = K\,T$ where K is the thermocouple constant. $V_{th}$ is amplified to equal $e_{th}$ by an amplification factor, $A_f$, so that $e_{th} = A_f V_{th}$. When $e_t$ and $A_f V_{th}$ are added, we have $$e_t + A_f V_{th} = e_p - e_{th} + A_f V_{th} = e_p \tag{3}$$

and the compensation is achieved.

$A_f$ can be obtained emperically by subjecting the transducer to a temperature change with no accompanying pressure change. In this case, the gage output should be zero. In an experiment, the transducer was immersed in hot or cold water and the value $A_f$ adjusted until the addition, $A_f V_{th} + e_t$, is zero.

A calculation of $A_f$ can be carried out by noting that $$\frac{q_{th}}{C_f} = \frac{\lambda A_e \Delta T}{C_f} \tag{4}$$

Substituting $T = V_{th}/K$ into equation (4)

$$e_{th} = \frac{q_{th}}{C_f} = \left[\frac{\lambda A_e}{C_f K}\right] V_{th} \tag{5}$$

The bracketed term is unitless and can be considered to be an amplification factor which, in practice, is attained through amplifiers $A_3$ and $A_4$. For typical values of: $\lambda = 4$ nC/cm °C, $A = 2$ cm², $C_f = 10{,}000$ pf, and $K = 41$ μV/°C (copper-constantan), $$\frac{\lambda A}{C_f K} \approx 2 \times 10^4 \tag{6}$$

The exact value of amplification which is needed for the particular transducer in use can be obtained by adjusting the gain of $A_4$.

Since positive $\Delta P$ will contract the volume of the transducer and positive $\Delta T$ will expand the volume, these two excitations will produce opposite electrical charge responses in the transducer. Therefore the corrected signal $e_p$ is obtained by adding $e_t$ and $e_{th}$. This is done in the adder $A_5$. The output of $A_5$ is the reverse polarity of the input and will give a positive voltage for a positive $\Delta P$ applied to the transducer.

The compensation circuit also contains output connections so that the thermocouple signal and the uncorrected transducer signal can be monitored. By inspecting the uncorrected signal, it is possible to obtain information about the pressure pulse at frequencies higher than $10^4$ Hz. In the compensating circuit, low noise operational amplifiers are used. This is particularly necessary at the high gain input amplifier $A_3$ where the noise was measured to be 1.5 μv rms for a bandwidth of $10^4$ Hz. With noise at this level it is possible to achieve a sensitivity of $\Delta T = 0.1\ °C$.

The following components were used in the temperature compensation circuit shown in FIG. 2:

Amplifiers $A_1$, $A_2$, $A_3$, $A_4$, and $A_5$: operational amplifier Resistors and capacitors:
$R_{in}$—5 ohms
$R_f$—22×$10^6$ ohms
$R_2$—4.7×$10^3$ ohms
$R_3$—560 ohms
$R_4$—2.2×$10^5$ ohms
$R_5$—22×$10^3$ ohms
$R_6$—1×$10^6$ ohm variable
$R_7$—5×$10^3$ ohms
$R_8$—5×$10^3$ ohms
$R_9$—5×$10^3$ ohms variable
$C_f$—$10^4$ pf
$C_2$—6800 pf
$C_4$—150 pf
$C_5$—10 μf.
Thermocouple: Copper-Constantan.

The configuration of the FIG. 2 is used because this arrangement will yield nearly coincident thermal response times for both the transducer charge, q(t), and the thermocouple voltage, V(t). If we consider thermal energy associated with a pressure pulse traversing across the thickness of the PVDF film from one side to the other, the conduction of heat can be described approximately by a solution to the heat flow equation in one dimension. The responses q(t) and V(t) will not be exactly the same, however, because V(t) changes directly with T(t), the temperature change, but q(t) follows the integral of temperature over the thickness of the film. Solutions to the heat equation are that both T(t) (or V(t)) and q(t) are expressed as Fourier series both of which contain the same dominant thermal time constant, $$T = \frac{l^2}{\pi^2 k} \tag{7}$$

where $l$ is the thickness of the transducer and $k$ is its thermal diffusivity. Since the time constant varies with $l^2$, it is important that thickness of the transducer be the same at the region of piezo-sensitivity and at the location of the thermocouple.

The differences in V(t) and q(t) appear in the coefficients of the Fourier series and in the constant term, but these differences are minimized in the symmetric configuration. For a transducer thickness of 2 mil (50 micrometers) with thermocouple and piezo-sensitive region symmetrically positioned in the center, calculations show that V(t) lags q(t) by 0.4 milliseconds (ms) and that the overall rise time is approximately 9 ms. It should be emphasized that this response time corresponds to the thermal response of the gage and is not indicative of its response to pressure. Response to pressure as fast as 50 nanoseconds (ns) has been observed in shock tests.

The inherent rise time of the thermocouple, independent of its surroundings, was measured using a light flash to deposit thermal energy at the thermocouple junction. The thermocouple signal is not determined by the thermal conductivity of the medium surrounding the junction, but rather by the geometry and electrical characteristics of the junction itself. Using a light pulse with a 20 μs rise time, it was observed that the rise time of the thermocouple was 50 μs. Thus, the thermocouple should respond satisfactorily to a thermal pulse with a rise time longer than 1 ms. In practice, the bilaminate, four layer transducer has a thickness of approximately 100 micrometers (0.10 mm) for which the thermal time constant is approximately 20 ms.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A pressure gage used to obtain accurate dynamic pressure data in a changing thermal environment, comprising:
   an active transducer producing a transducer output signal which is uncorrected for thermal effects, said active transducer being composed of polyvinylidene fluoride;
   a thermocouple having a short rise time and producing an output thermal signal which dynamically responds to changing thermal conditions, said thermocouple being a copper-constant thermocouple made with wire, said thermocouple residing within said transducer; and
   a compensation means receiving said transducer output signal from said transducer and said output thermal signal from said thermocouple, said compensaton means producing a corrected pressure signal, said corrected pressure signal representing accurate pressure data which is corrected for changing thermal conditions.

2. A pressure gage as defined in claim 1, wherein said compensation means comprises:
   first, second, third, fourth and fifth amplifier circuits, said first amplifier circuit receiving said transducer output signal from said transducer, and producing an uncorrected output signal, said uncorrected output signal being pressure data uncorrected for thermal changes in the environment of said transducer;
   said second amplifier circuit receiving said uncorrected output signal from said first amplifier circuit, said second amplifier having a gain of unity producing a buffered uncorrected output signal;
   said third and fourth amplifier circuits receiving said output thermal signal produced by said thermocouple; and producing an amplified output thermal signal; and
   said fifth amplifier circuit receiving and adding said buffered uncorrected output signal from said second amplifier circuit and said amplifier output thermal signal from said fourth amplifier circuit, said fifth amplifier circuit producing said corrected pressure signal.

3. A pressure gage as defined in claim 2, wherein said first amplifier circuit comprises:
   an input resistor conducting transducer output signal from said transducer into said first amplifier circuit;
   a first amplifier receiving said transducer output signal from said input resistor on its inverting input terminal and producing said uncorrected output signal on its output terminal, said first amplifier having its noninverting input terminal connected with a common electrical ground;

a first capacitor connecting said first amplifier output terminal with its inverting input terminal; and a first resistor being in a parallel circuit with said first capacitor, said first resistor connecting said first amplifier's output terminal with its inverting input terminal 4. A pressure gage as defined in claim 3, wherein said second amplifier circuit comprises:

a second resistor connecting the output terminal of said first amplifier with said second amplifier circuit;

a second amplifier having a gain of unity and receiving said uncorrected output signal on its noninverting input terminal, said second amplifier having its output terminal connected with its inverting input terminal, said second amplifier producing said buffered uncorrected output signal on its output terminal; and a second capacitor connecting said second amplifier's noninverting input terminal with a common electrical ground 5. A pressure gage as defined in claim 4, wherein said third amplifier circuit comprises:

a third amplifier receiving said output thermal signal from said thermocouple on its noninverting input terminal and producing a third amplifier circuit output signal in its output terminal;

a third resistor connecting said third amplifier's inverting input terminal with a common electrical ground;

a fourth resistor connecting said third amplifier output terminal with it inverting input terminal; and a third capacitor connecting said third amplifier output terminal with its inverting input terminal, said third capacitor being in a parallel circuit with said fourth resistor.

6. A pressure gage as defined in claim 5, wherein said fourth amplifier circuit comprises:

a fourth capacitor receiving said third amplifier circuit output signal from said third amplifier's output terminal;

a fifth resistor receiving said third amplifier circuit output signal from said fourth capacitor;

a fourth amplifier receiving said third amplifier circuit output signal from said fifth resistor on its inverting input terminal, said fourth amplifier having its noninverting input terminal connected with a common electrical ground, said fourth amplifier producing said amplified output thermal signal on its output terminal; and a sixth resistor having variable impedance, said sixth resistor connecting the output terminal of said fourth amplifier with its inverting input terminal.

7. A pressure gage as defined in claim 6, wherein said fifth amplifier circuit comprises:

a seventh and eighth resistors, said seventh resistor conducting said buffered uncorrected output signal from said second amplifier circuit into said fifth amplifier circuit;

said eighth resistor conducting said amplified output thermal signal from said fourth amplifier circuit into said fifth amplifier circuit;

a fifth amplifier receiving said buffered uncorrected output signal from said seventh resistor and said amplified output thermal signal from said eighth resistor on its inverting input terminal, said fifth amplifier having its non-inverting input terminal connected with a common electrical ground, said fifth amplifier adding said amplified output thermal signal with said buffered uncorrected output signal and producing said corrected pressure signal on its output terminal; and a ninth resistor having variable impedance and connecting said fifth amplifier's output terminal with its inverting input terminal.

8. A pressure gage as defined in claim 7, wherein said active transducer comprises:

first, second, third and fourth sheets, each being composed of polyvinylidene fluoride, said second and third sheets each having piezoelectrically active areas, said first, second, third and fourth sheets being laminated together with said first and fourth sheets on the outside and said second and third sheets laminated with their respective piezoelectrically active areas facing each other in the middle with their respective active areas having polarization vectors in opposite directions, said second and third sheets enclosing said thermocouple in their inactive areas, said thermocouple residing within said second and third sheets within two millimeters of said piezoelectrically active areas of said second and third sheets.

9. A process of making a polyvinylidene flouride transducer comprising the steps of:

(a) depositing aluminum electrodes on a portion of the surface areas of a first and second strips, said first and second strips being composed of polyvinylidene fluoride;

(b) activating said first and second strips after said depositing step, said activating step being conducted by exposing said first and second strips to an electric field of approximately two megavolts/centimeter;

(c) laminating said first and second strips together with their surface areas containing said aluminum electrodes facing each other such that all polarization vectors are pointed in opposite directions, said first and second strips containing a copper-constant thermocouple wire placed between said first and said second strip within approximately two millimeters of said surface areas containing said aluminum electrode; said laminating step occuring after said activating step;

(d) surrounding said first and second strips by laminating a third and fourth strip of polyvinylidene flouride as outside layers to said first and second strips, said surrounding step occuring simultaneously or after said laminating step.

* * * * *